United States Patent [19]
Greenwood

[11] Patent Number: 5,843,266
[45] Date of Patent: Dec. 1, 1998

[54] FORMABLE REINFORCING BAR AND METHOD FOR MAKING SAME

[75] Inventor: Mark E. Greenwood, Granville, Ohio

[73] Assignee: Owens Corning Fiberglas Technology, Inc., Summit, Ill.

[21] Appl. No.: 816,219

[22] Filed: Mar. 12, 1997

Related U.S. Application Data

[63] Continuation of Ser. No. 762,482, Dec. 9, 1996, Pat. No. 5,650,220, which is a continuation of Ser. No. 451,591, May 26, 1995, abandoned.

[51] Int. Cl.[6] .................................................. B32B 31/00
[52] U.S. Cl. ..................... 156/276; 156/167; 156/182; 156/298; 156/288; 156/296; 264/174; 264/178
[58] Field of Search ................................... 428/377, 294, 428/357; 57/200, 220, 217, 221, 232, 234; 52/737, 738, 739; 156/167, 182, 296, 288, 298, 178, 267, 276; 264/174, 178

[56] References Cited

U.S. PATENT DOCUMENTS 2,425,883  8/1947  Jackson ........................................ 72/59
4,620,401  11/1986  L'Espérance ......................... 52/309.85
4,912,781  4/1990  Robins et al. .
5,077,113  12/1991  Kakihara et al. .

*Primary Examiner*—Merrick Dixon
*Attorney, Agent, or Firm*—C. Michael Gegenheimer; Inger H. Eckert

[57] ABSTRACT

A formable reinforcement bar, a process for producing a formable reinforcing bar and a supported structure including a formable reinforcement bar are provided. The reinforcement bar includes a body portion of a fiber reinforced thermoplastic material. The process involves laminating multiple layers of thin strips or bundles of fiber reinforced thermoplastic to produce the formable rebar. The formable rebar may be produced at remote locations such as a construction site. The supported structure includes a composite material having a formable rebar embedded therein.

16 Claims, 2 Drawing Sheets

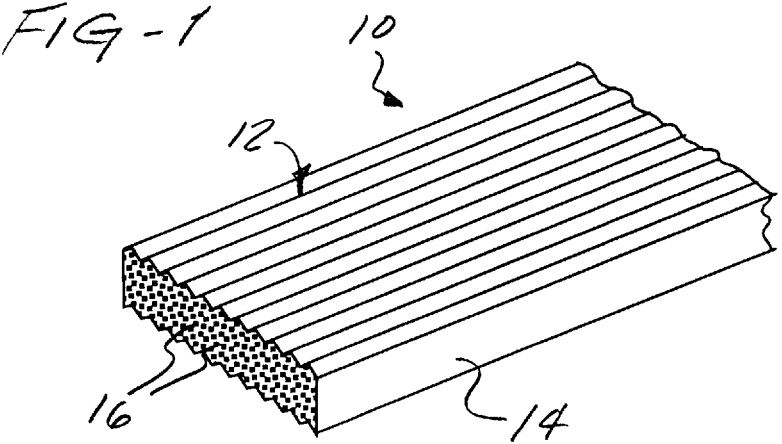
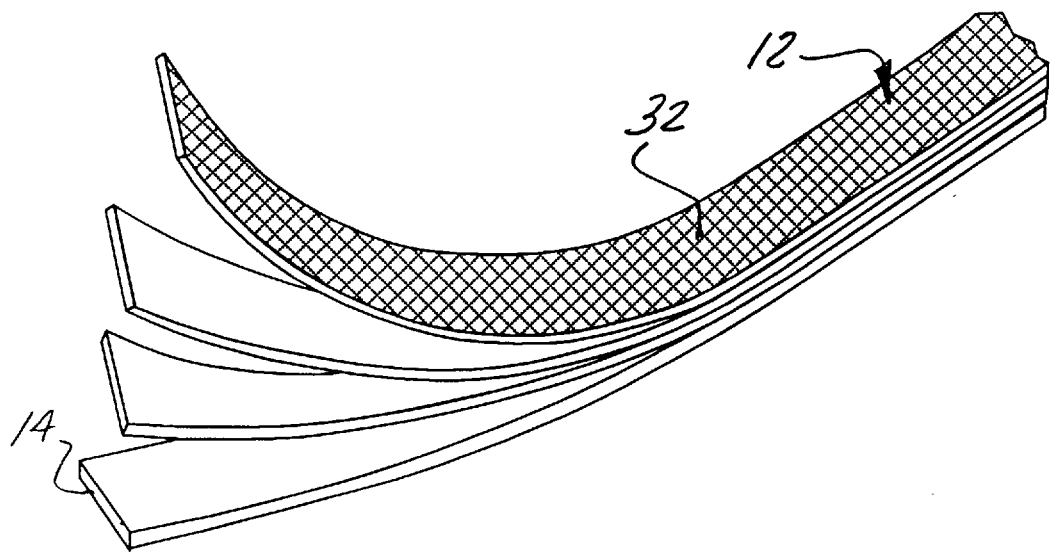

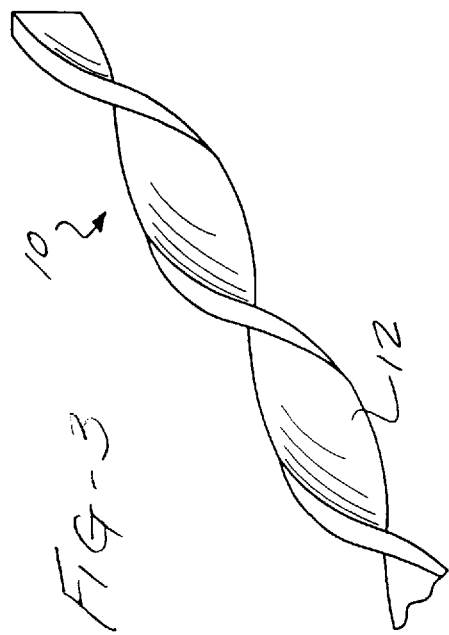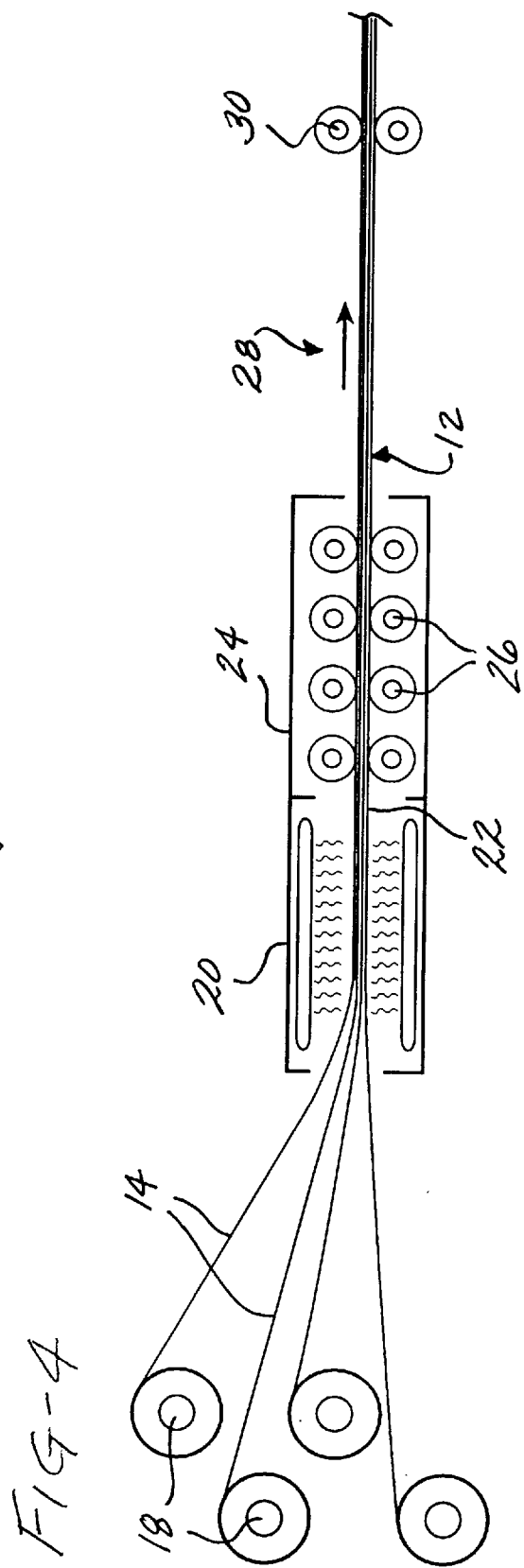

FORMABLE REINFORCING BAR AND METHOD FOR MAKING SAME

CROSS-REFERENCE TO RELATED APPLICATION

This is a request for filing a continuing application under 37 CFR 1.60 of pending prior application Ser. No. 08/762,482, filed Dec. 9, 1996, now U.S. Pat. No. 5,650,280, which is a continuation of Ser. No. 08/451,591, filed May 26, 1995, now abandoned.

BACKGROUND OF THE INVENTION

This invention relates to a formable reinforcing bar for structural support in construction applications and a method for making a formable reinforcing bar. More particularly, this invention relates to a formable reinforcing bar of a fiber reinforced thermoplastic material.

Reinforcing bars, or rebars, are employed for structural support in a wide number of construction applications. For instance, rebars are incorporated into concrete and various other materials in the construction of bridges, buildings, roadways and the like to provide additional support.

Traditionally, rebars have been manufactured from a metal such as steel or other metal alloy materials. However, traditional metal rebars have a number of significant disadvantages. Most concrete structures are exposed to moisture, acids and chlorine containing chemicals which slowly corrodes the metal over time. Thus, the lifetime of metal rebars is limited. Metal rebars are manufactured in a mill or other production facility in the desired end shape and then shipped, at high cost, to the construction site. By having prescribed lengths, metal bars must be cut to length at the construction site which causes waste and additional cost. They cannot be manufactured at a remote location, such as the construction site. Further, metal rebars can only be shaped or formed at the construction site with significant effort to fit the varying needs arising during the course of construction.

In addition to metal reinforcing bars, rebars have also been made from reinforced thermosetting polymer materials. The thermoset polymers are reinforced with fibers to provide the required strength for structural support. These thermoset polymer rebars offer the advantage of being generally more resistant to corrosion than their metal counterparts. In addition, they generally weigh less than metal rebars, thereby reducing shipping costs.

Once a thermoset polymer is fixed in a particular shape, that fixed shape cannot be changed. In other words, a thermoset polymer may not be formed or manipulated once the polymer has cured. Accordingly, a thermoset rebar is not formable in the sense that the rebar can have its shaped changed on the job site to correspond with the changing construction environment. In addition, rebars of thermosetting polymers must be made in a manufacturing facility. Remote production is not possible as the thermoset rebar must be manufactured to its final dimensions immediately.

Accordingly, there remains a need for a corrosion resistant reinforcing bar for structural support in construction applications which is formable after the bar has been manufactured and which is capable of being manufactured in remote locations such as at a construction site.

SUMMARY OF THE INVENTION

This need is met by the present invention wherein a formable reinforcement bar is provided. The formable reinforcement bar of the present invention may be shaped or formed on the construction site after the reinforcing bar has been produced. This provides the rebar of the present invention a versatility in usage which the reinforcing bars of the prior art cannot achieve. In addition, the rebar of the present invention can be produced from pre-preg layers in remote locations such as the construction site, thereby providing additional versatility and reduced cost over the reinforcing bars of the prior art.

Thus, in accordance with the present invention a formable reinforcing bar for structural support is provided. The formable reinforcement bar comprising a body portion having at least one layer of a fiber reinforced thermoplastic polymer material. The layer has multiple continuous fibers completely embedded in the thermoplastic material. The fibers are preferably glass fibers, carbon fibers, aramid fibers or polyamide fibers, with glass fibers most preferred. The continuous fibers preferably comprise about 20% to about 80% of the total volume of the body portion, and more preferably about 40% to about 60% of the total volume, of the reinforcing bar.

In one embodiment of the invention, the reinforcement bar has a tension load capacity of at least about 500 pounds, preferably at least about 1,000 pounds, and most preferably about 5,000 pounds, and is thermoformable after the reinforcement bar is produced. In addition, the reinforcement bar may be bent, twisted or helically spiralled. The reinforcement bar may be most any desired shape such as rectangular, square, angled or circular.

The body portion may be formed from at least two layers which are laminated together. The layers are preferably strips of thermoplastic material having continuous fibers completely embedded therein or bundles of continuous fibers completely coated with a thermoplastic material. The body portion may include at least one outer face which is textured. The texturing may be accomplished by knurling the outer face, impregnating the outer face with particles, or including raised members on the outer face. Further, the thermoplastic material may include particles or flakes of a metal, polar or magnetic material incorporated therein.

In accordance with an additional aspect of the present invention, there is provided a structure supported with the reinforcing bar of the present invention. The supported structure comprises a composite material having a reinforcing bar embedded therein. The reinforcing bar comprises a body portion having at least one layer of a thermoplastic polymer material. The layer has multiple continuous fibers completely embedded in the thermoplastic material. The continuous fibers are preferably about 20% to about 80% of the total volume of the body portion, and more preferably about 40% to about 60% of the total volume of the body portion. Further, the reinforcement bar has a tension load capacity of at least about 500 pounds, more preferably at least about 1,000 pounds and most preferably about 5,000 pounds.

The composite material is preferably Portland cement concrete, asphalt concrete or polymer concrete. The continuous fibers are preferably glass fibers, carbon fibers, aramid fibers or polyamide fibers, with glass fibers being the most preferred. The body portion may be at least two layers laminated together. In addition, the layers are preferably strips of thermoplastic material having continuous fibers completely embedded therein or bundles of continuous fibers completely coated with a thermoplastic material. The body portion may include at least one outer face which is textured.

In accordance with another aspect of the present invention, a process for producing a formable reinforcing bar is provided. The process comprises providing at least two layers comprising a thermoplastic polymer material having multiple continuous fibers completely embedded in the thermoplastic polymer material. The layers are passed through a pre-treating zone to pre-treat the layers. Next, the pre-treated layers are passed through a lamination zone where the layers are brought into contact with each other and consolidated to form a laminated body portion. The body portion is passed through a post-treating zone where the body portion is cooled to form a reinforcing bar which is thermoformable after it is produced.

The continuous fibers are preferably glass fibers, aramid fibers, carbon fibers, or polyamide fibers with glass fibers being the most preferred. The continuous fibers may comprise about 20% to about 80% of the total volume of the body portion, and preferably about 40% to about 60% of the total volume of the body portion. In addition, the layers are preferably strips of thermoplastic material having continuous fibers completely embedded therein or bundles of continuous fibers completely coated with thermoplastic material.

The process of the present invention may further include the steps of cutting the reinforcing bar to a desired length and/or providing texture to at least one outer face of the body portion. The texture may be provided by knurling the outer face, impregnating the outer face with particles or including raised members on the outer face. The heating step may be accomplished by supplying heated forced gas, infrared radiation, microwave radiation, radio waves, or induction heating. An additional step in the process may include the step of thermoforming the reinforcing bar after the bar is produced. The step of thermoforming may comprise heating and twisting or bending the reinforcing bar. The reinforcing bar may also be produced at a remote location.

The step of pre-treating the thermoplastic layers may comprise a heating step. After the heated layers are laminated, they are passed to a post-treating zone wherein the body portion is cooled. Alternatively, the pre-treating step may comprise the application of a solvent to the thermoplastic layers. Once compressed, the solvent is evaporated or otherwise allowed to dry in a post-treating step when the thermoplastic layers are laminated or bonded together.

BRIEF DESCRIPTION OF THE DRAWINGS

FIG. 1 is a perspective view of the formable reinforcing bar of the present invention.

FIG. 2 is an exploded perspective view of the formable reinforcing bar of the present invention.

FIG. 3 is a perspective view of the formable reinforcing bar the present invention after being thermoformed into a spiral shape.

FIG. 4 is a schematic view in elevation of the process by which the formable reinforcing bar of the present invention is produced.

DETAILED DESCRIPTION OF THE PREFERRED EMBODIMENTS

The present invention comprises a formable reinforcement bar or rebar for providing structural support in construction applications. The present invention involves rebars of thermoplastic materials. Thermoplastic materials may be easily softened by the application of heat and shaped. When cooled, the thermoplastic rigidly assumes the new position. This provides a versatility unmatched by prior art reinforcement bars, as the rebars of the present invention may be tailored to fit exact specifications without difficulty or delay. In addition, the formable rebar of the present invention may be produced at remote locations such as the construction site. Production at a remote location would significantly reduce the cost of shipping and waste from that of transporting preformed reinforcement bars.

Referring to FIG. 1, the formable reinforcing bar 10 of the present invention is shown. The rebar 10 comprises a body portion 12. The body portion 12 has at least one layer of a thermoplastic polymer material 14 with multiple continuous fibers 16 completely embedded in the thermoplastic material. Preferably, the body portion 12 is formed from multiple thermoplastic layers 14. Of course, one of ordinary skill in the art will recognize that the number of layers employed will depend upon the desired application for rebar 10.

The thermoplastic material in thermoplastic layers 14 may generally be most any polymer of the general class of thermoplastic polymers. In fact, the specific thermoplastic material employed will in many cases depend upon the end use and location of the rebar 10. Various thermoplastic materials have varying properties such as resistance to corrosion, stiffness or strength. Preferably, the thermoplastic material is compatible with the building material into which it will be incorporated, such as concrete or the like. Examples of suitable thermoplastic materials which can be employed in the present invention include high density polyethylene, polypropylene and copolymers of polypropylene with various materials, polyphenylene sulfide and polyvinyl chloride.

Fibers 16 are continuous fibers of filaments which are suitable for incorporation into the thermoplastic material 14. Continuous fibers, as intended herein, are fibers produced from drawing processes and which have not been cut to specific lengths. However, non-continuous fibers, such as those which have been cut to length or formed in a rotary process, may also be included in the thermoplastic material along with the continuous fibers. While most any continuous fiber may be employed, glass fibers, carbon fibers, aramid fibers or polyamide fibers are preferred, with continuous glass fibers being the most preferred.

Continuous fibers 16 are included to provide strength to the thermoplastic material 14. Thus, the fibers 16 are embedded in the thermoplastic material or, in other words, completely encapsulated with thermoplastic material. Complete encapsulation of the fibers 16 by the thermoplastic material is desired so as to provide the greatest degree of strength possible from the materials present. However, too high a content of fibers 16 in body portion 12 reduces the amount of thermoplastic polymer in the body portion 12. As a result, not all the fibers are sufficiently coated with the thermoplastic material thereby actually reducing the strength and environmental resistance of the layer. In addition, the difficulty of producing the rebar 10 is increased due to increased difficulty in coating the fibers. On the other hand, too low a content of fibers reduces the strength of the rebar to unsatisfactory levels.

Thus, the volume of continuous fibers 16 in body portion 12 is selected to impart an optimum balance between strength and ease of production and performance. Preferably, continuous fibers 16 comprise from about 20% to about 80% of the total volume of body portion 12 with the remainder of each layer 14 being the thermoplastic material encapsulating the continuous fibers 16. Most preferably, the continuous fibers 16 comprise from about 40% to about 60% of the total volume of the body portion 16.

The combination of thermoplastic material and continuous fibers 16 in the reinforcement bar 10 of the present invention must be sufficient to provide the rebar 10 with a tension load capacity of at least about 500 pounds. Tension load capacity is a measure of the strength of a rebar. Tension load capacity is a measure of the amount of load at which a particular rebar would fail when loaded with tension. Tension load capacity is measured by placing a rebar in any number of available testing apparatuses and applying force to each end of the rebar in opposite directions. The amount of force required to cause the rebar to fail is then the tension load capacity. A description of a suitable testing procedure can be found, for example, in ASTM D638. Preferably, the tension load capacity of the rebar of the present invention of at least about 500 pounds, more preferably at least about 1,000 pounds, and most preferably at least about 5,000 pounds.

The thermoplastic material comprising layer 14 may also include particles or flakes incorporated into the thermoplastic material. The incorporated particles or flakes enhance the heating ability of the thermoplastic material, thus, allowing the thermoplastic to heat more quickly and/or more uniformly for re-forming. The incorporated flakes and particles may be selected from metal or alloy materials, polar materials or magnetic materials. Thus, the thermoplastic material will heat more quickly if alternative heating methods, such as infrared or microwave radiation, radio waves, or induction heating are used.

As discussed previously, one of the many advantages of the rebar 10 of the present invention lies in that the rebar 10 is formable after it has been produced. That is, once the rebar is manufactured, it may still be formed into various shapes easily by the application of heat and force to the thermoplastic. This is in extreme contrast to thermoset polymer rebars. Once a thermoset polymer rebar has been produced, its shape cannot be changed, but rather is fixed in the manufactured shape. Metal or alloy rebars can be re-formed after manufacture only after the application of extreme temperatures or forces. They may not be easily re-formed by the mere application of relatively low temperatures to the thermoplastic material as in the present invention.

The rebar of the present invention may be re-formed after manufacture. For instance, the rebar may be bent or twisted as shown in FIG. 3 for application in the construction site. Alternatively, a straight rebar may be provided with a hook on one or both ends. The rebar 10 may be re-formed by a thermoforming process or, in other words, the application of heat. To re-form the rebar, the thermoplastic material in the area to be formed must simply be heated, for instance by a heat gun or other means, to the point at which the thermoplastic material employed becomes softened or pliable, commonly known as the softening point temperature. The heated rebar then is simply shaped then allowed to cool. The re-formed rebar is then fixed in the new shape and can be immediately employed in the construction site.

The ability to be re-formed provides a previously unknown versatility to the rebar 10 of the present invention. Previously, a thermoset or metal rebar was received at the construction site in a pre-formed shape. That shape was then made to fit into the structure to which it was to provide support as best as possible. In many instances, the rebar was cut and the unused portion discarded, increasing costs and waste. The rebar 10 of the present invention may be re-formed and tailored to fit specific applications by workers on the construction site. Accordingly, there is less waste and, thus, lower cost involved than with thermoset or metal rebars.

The rebar 10 of the present invention may also include texturing on at least one outer face of the body portion 12. Texture on at least one outer face provides improved bonding between the material into which the rebar is placed and the rebar itself. Texturing may be achieved by any number of various methods including knurling the outer face or faces, impregnating particles into the outer face or faces, including raised members on the outer face or faces, or embossing a textured surface.

The present invention also includes a process for producing the formable rebar 10 of the present invention. As mentioned previously, the formable rebar comprises at least one layer 14 of thermoplastic material. Thus, while the rebar 10 may comprise a single layer, the rebar 10 preferably comprises at least two layers and more preferably multiple layers of thermoplastic material. The layers 14 preferably comprise strips of thermoplastic material having continuous fibers completely embedded therein, or bundles of continuous fibers completely coated with the thermoplastic material.

To produce the strips or bundles as the pre-preg layers 14, the strips or bundles may be produced by numerous processes which will produce a thermoplastic having fibers embedded in the polymer material. Preferably, the strips or bundles are produced by impregnating multiple strands of fibers with thermoplastic resins through a die as described in U.S. Pat. No. 4,937,028, the disclosure of which is herein incorporated by reference, or by heating multiple strands of preimpregnated fibers and consolidating them through a die or by compression rolls, or other means in the art to form strips of reinforced thermoplastic.

Turning now to FIGS. 2 and 4, the preferred lamination process for producing the formable rebar 10 of the present invention is shown. The process involves providing at least two, and preferably multiple, fiber reinforced thermoplastic layers 14. While the layers 14 may be of any known dimensions, the layers are preferably from about 1/32 inch to about 1/4 inch in thickness by about 0.5 to 2 inches in width. Of course, the cross-sectional area of the formed rebar 10 will depend upon the desired end use dimensions and can be varied by varying the number and width of layers 14 employed in the rebar 10. The layers 14 are preferably supplied on spools 18 of wound, continuous strips or bundles as discussed above. The continuous thermoplastic layers are unwound from the supply spools 18 and passed into a pre-treating zone 20. Pre-treating zone 20 provides a pre-treating step to prepare the surfaces of the layers to be laminated together.

Pre-treating the surfaces of the layers 14 to be laminated together may comprise either the application of heat or of a suitable solvent. The pre-treating step of heating may be accomplished by the application of heated forced gas, infrared radiation, microwave radiation, induction heating or radio waves, all of which are well-known in the art of heating polymers. The thermoplastic layers 14 are heated to the point at which the thermoplastic material becomes pliable and bondable.

Alternatively, the pre-treating step may comprise the application of a suitable solvent to the surfaces of the layers to be laminated. The solvent, once applied, dissolves or solubilizes a small amount of thermoplastic material on the surface of the layers. Suitable solvents may varying depending upon the particular thermoplastic employed but include, among other, methylene chloride.

The individual layers 14 are brought into contact with each other either during or after the pre-treating stage. Once in contact, the pre-treated layers 14 are passed into a lamination zone 24 where the pre-treated layers 14 are consolidated by a series of compression rollers 26 to form body portion 12. The pre-treated layers 14 may be aligned either vertically, one on top of the other, or horizontally in a side-by-side arrangement. The pre-treated layers, once compressed together, bond with each other to form the integral body portion 12 of the rebar 10.

The body portion 12, once formed, is passed to a post-treating zone 28 where the bonds between the pre-treated layers 14 of body portion 12 are allowed to set. The post-treating zone 28 is preferably merely a cooling stage where the layers if heated may be cooled or a solvent if applied is allowed to evaporate while the polymer material sets. During the post-treating step, the process may also include the additional step of cutting the body portion 12 into desired lengths of the rebar 10 to eliminate waste. The cutting may accomplished by any known cutting means including a cutting blade (not shown). Lastly, the thermoplastic material may be pulled through the process by tension or pulling wheels 30 to provide a constant rate of material passing through the process if the consolidation rolls 26 do not provide the pulling force.

The process may also include the additional step of providing texture 32 onto at least one outer surface of the body portion 12. The step of texturing may include various known means of providing texturing to polymer materials, but preferably includes knurling at least one outer surface by various means such as making cross-hatched, diagonal or patterned cuts or channels into the outer surface. The external texturing would most likely be imparted through the transfer of a textured surface on the compression rolls 26. In addition, the step of providing texture may also preferably include heating or softening the outer surface thermoplastic material then embedding particles of various materials in the softened material. The step of texturing may also include providing raised members on at least one outer face.

One of the many advantages of the present invention includes the ability to produce the rebar 10 at remote locations such as the on the construction site. As the process does not require the melting of metals or alloys, or a pultrusion step as in thermoset polymers, both of which must be conducted in a formal production facility, the process may be conveniently and easily conducted in remote locations, as well as, in a production facility. This ability for remote production provides a significant advantage over the prior art processes and rebars. The cost of shipping a pre-formed rebar, as in the prior art, is much greater than the cost of shipping the pre-preg layers 14 of the present invention. Thus, shipping the pre-preg layers then forming the rebar 10 of the present invention then producing the rebars 10 on the construction site will provide a significant cost savings to the user over the rebars of the prior art.

The present invention also includes a combination supported structure and reinforcing bar. The rebar of the present invention is designed for inclusion into structures under construction to provide support to the structure once completed. Such structures commonly include walls and floors in buildings, roadbeds, bridges, and various other structures. The rebars of the present invention are embedded into materials such as concrete and asphalt that are commonly used to construct the supported structures. Thus, an aspect of the present invention includes a supported structure comprising a composite material having the rebar of the present invention embedded in the construction material. The construction material in which the invention is incorporated as a reinforcing or supporting member is preferably Portland cement concrete, asphalt concrete or polymer concrete.

Having described the invention in detail and by reference to the preferred embodiment thereof, it will be apparent that modifications and variations are possible without departing from the scope of the invention which is defined in the appended claims.

I claim:

1. A process for producing a formable reinforcing bar comprising:

providing at least two layers, said layers comprising a thermoplastic polymer material having multiple continuous fibers completely embedded in said thermoplastic polymer material;

passing said layers through a pre-treating zone to pretreat said layers;

bringing said pre-treated layers into contact;

passing said pre-treated layers through a lamination zone wherein said layers are compressed to form a laminated body portion, and passing said body portion to a post-treating zone whereby said body portion is post-treated thereby forming a reinforcing bar which is thermoformable after said reinforcing bar is produced.

2. The process as claimed in claim 1 wherein said continuous fibers are glass fibers, aramid fibers, carbon fibers, or polyamide fibers.

3. The process as claimed in claim 2 wherein said continuous fibers are glass fibers.

4. The process as claimed in claim 1 wherein said layers are strips of thermoplastic material having continuous fibers completely embedded therein.

5. The process as claimed in claim 1 wherein said layers comprises bundles of continuous fibers completely coated with thermoplastic material.

6. The process as claimed in claim 1 further including the step of providing texture to at least one outer face of said body portion in said lamination zone.

7. The process as claimed in claim 6 wherein said step of providing texture comprises knurling said outer face, impregnating said outer face with particles or including raised members on said outer face.

8. The process as claimed in claim 1 further including cutting said reinforcing bar to a desired length.

9. The process as claimed in claim 1 further including the step of thermoforming said reinforcing bar after said bar is produced.

10. The process as claimed in claim 9 wherein said step of thermoforming comprises heating and twisting or bending said reinforcing bar.

11. The process as claimed in claim 1 wherein said reinforcing bar is produced at a remote location.

12. The process as claimed in claim 1 wherein said continuous fibers comprise about 20% to about 80% of the total volume of said body portion.

13. The process as claimed in claim 12 wherein said continuous fibers comprise about 40% to about 60% of the total volume of said body portion.

14. The process as claimed in claim 1 wherein said step of pre-treating comprises heating said layers and said step of post-treating comprises cooling said laminated body portion.

15. The process as claimed in claim 14 wherein said step of heating is accomplished by supplying heated forced gas, infrared radiation, microwave radiation, radio waves or induction heating.

16. The process as claimed in claim 1 wherein said step of pre-treating comprises applying a solvent to said layers and said step of post-treating said laminated body portion comprises allowing said solvent to evaporate or otherwise dry.

* * * * *